Jan. 11, 1927.
C. G. MORRELL
BUMPER
Filed March 15, 1926
1,614,251
2 Sheets-Sheet 1
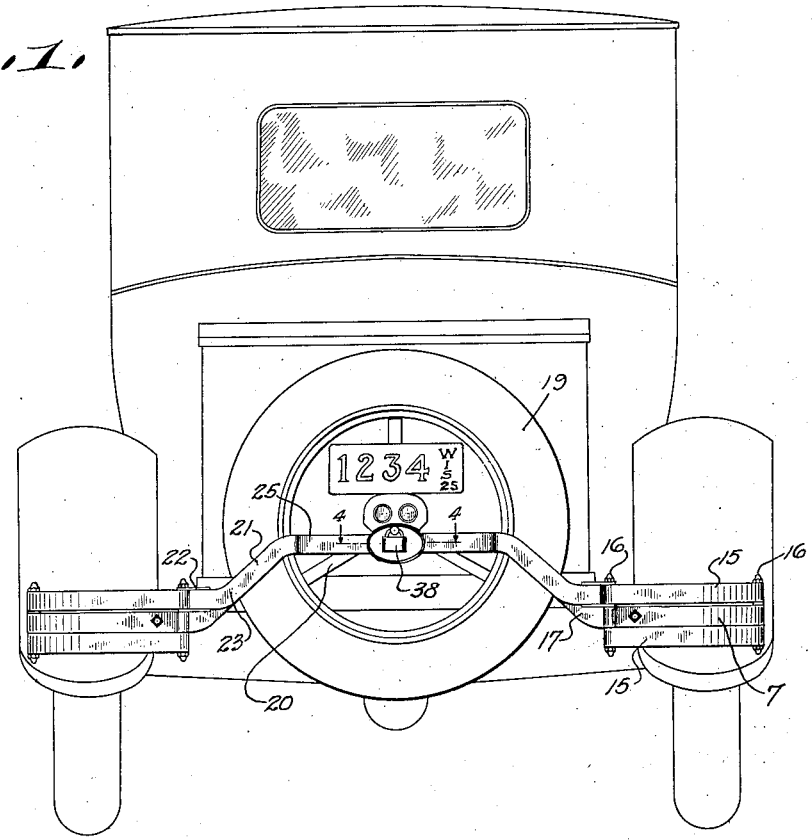
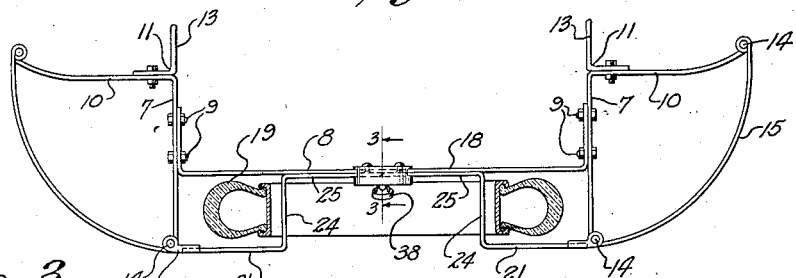
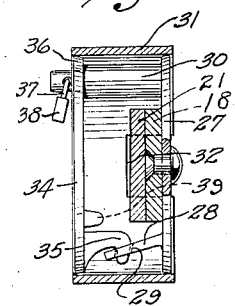
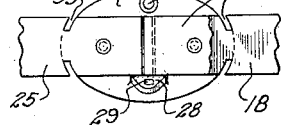
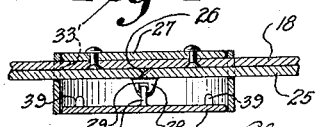
INVENTOR.
Charles H. Morrell
BY
Charles & French
ATTORNEYS Jan. 11, 1927.  
C. G. MORRELL  
BUMPER  
Filed March 15, 1926  
1,614,251  
2 Sheets-Sheet 2

INVENTOR.  
Charles G. Morrell  
BY  
Charles & French  
ATTORNEYS

Patented Jan. 11, 1927.

1,614,251

UNITED STATES PATENT OFFICE.

CHARLES G. MORRELL, OF OAK PARK, ILLINOIS.

BUMPER.

Application filed March 15, 1926. Serial No. 94,858.

The invention relates to automobile bumpers, and more particularly to bumpers for use on the rear of an automotive vehicle.

The object of the invention is to provide an automobile bumper for the rear end of the vehicle, and more particularly one for use on automotive vehicles having spare wheels or tires at the rear, the bumper being so constructed that it will not only protect the rear of the vehicle but will also act as a protection for the spare wheel or tire and as a lock about the same to prevent unauthorized removal.

The invention further consists in the several features hereinafter set forth and more particularly defined by claims at the conclusion hereof.

In the drawings Fig. 1 is an elevation view of a bumper embodying the invention, applied to the rear of an automotive vehicle;

Fig. 2 is a detail plan view of the bumper with a spare tire shown in connection therewith, in section;

Fig. 3 is a detail sectional view taken on the line 3—3 of Fig. 2;

Fig. 4 is a detail sectional view taken on the line 4—4 of Fig. 1;

Fig. 5 is a detail elevation view of the lock, parts being removed;

Figure 6:
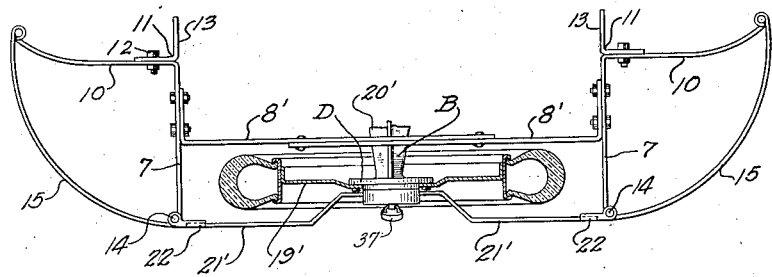
Fig. 6 is a view similar to Fig. 2, showing the device used in connection with a spare wheel.

The bumper embodying the invention is preferably of the spring bar type, and consists in each instance of angled end bars 7 connected by a transverse angled frame bar 8 or 8', as by rivets or locked bolts 9, the rear outwardly-extending angled portions 10 of the bar 7 having angle brackets 11 secured thereto, as by bolts 12, the forwardly-extending portions 13 of said brackets being adapted to be key-bolted, or otherwise fixedly locked, to the frame of the vehicle at its rear end. Each of the angle bars 7 has eyed ends formed therein to receive a bolt 14 which has an extension on either side of each bar 7 that is designed to receive the eyed ends of curved fender-protecting bars 15, said bars curved from the outer end of one of the legs of the bar 7 to the outer end of the other leg of the bar 7, as will be clearly apparent from Fig. 2. The pins 14 have suitable heads 16 to hold the bars 15 and 7 in proper alignment. Thus the bars 10 and 15 cooperate to form rear buffer sections.

It will be noted from Figs. 1 and 2 that while the bar 8 extends across and between the bars 7, that it is curved or bent upwardly from the bar 7, as at 17, and then has a portion 18 connecting these bent portions 17.

Figs. 1 and 2 illustrate a spare tire 19 mounted on a rack or bracket 20, of any suitable construction, secured to the rear end of the automobile, the frame bar 8 being disposed behind the tire, and in order to lock the tire against unauthorized removal the bumper has angled tire-receiving bars or sections 21. Each of these bars has hinge plates 22 secured thereto and mounted on the pins 14 and straddling the upper fender-protecting bar 15, the bars inclining upwardly, as at 23, from their hinge connection, and then inwardly, as at 24, and thence laterally, as at 25, the portions 25 of these bars abutting against the portion 18 of the bar 8 their ends preferably inclined relative to each other to form a scarf joint 26, as shown in Fig. 4.

Figure 7:
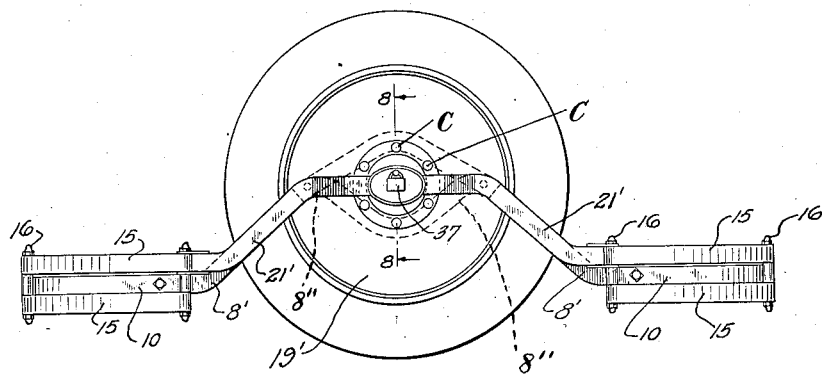
Fig. 7 is an elevation view of the device shown in Fig. 6.
Figure 8:
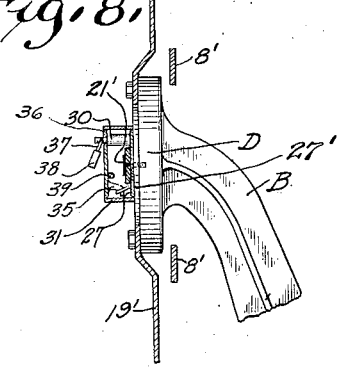
Fig. 8 is a detail sectional view taken on the line 8—8 of Fig. 7.

In Figs. 6 to 8, inclusive, a spare wheel 19', of the disk type with tire attached, is shown as mounted or bolted to a holder 20', of known construction, adapted to be fixedly secured to the rear end of the automobile as by a bracket portion B, said holder having a disk portion D to which the web of the disk wheel is secured by bolts C. In this instance the rear frame member 8' is made in two parts riveted together, said parts being bent at 8" so as to permit their being slipped over and behind the portion D and behind the spare wheel and tire which is locked against unauthorized removal by the bar or sections 21', generally similar to the bars 21 and similarly hinged at 22' to the pins 14, the portion of these bars abutting in this instance against a lock plate 27, hereinafter described, the free ends of these bars abutting each other as in the first-described construction.

In Figs. 1 and 2 the bars 21 cooperate with the bar 8 and the bars 7 to form a frame surrounding parts of the tire, and by locking the free ends of the bars 21 together it will be noted that the tire cannot be removed until the bars 21 have been released and swung out to a position to permit removal of the tire from the holder 20. In a similar manner the bars 21' cooperate with the bars 8' and the bars 7 to form a frame surrounding the spare wheel or tire 19'.

Any suitable means may be used for locking the bars 21 or 21' in tire-locking position, and one form of lock is shown. In each instance this lock includes a plate 27 either secured to the back bar 8 and centrally thereof, as in Figs. 1 and 2, or secured to the front face of the disk D of the holder 20', as shown in Fig. 8, and provided with a lug 28 having an eye 29 and a lug 30. A tubular member 31 is designed to slidably fit over the edges of the plate 27, and is notched as at 32 to engage in notches 33 in the ends of the bars 21 or 21' and registering notches 33' in the bar 8 in Figs. 1 and 2 only, while in the construction shown in Figs. 6 to 8, inclusive, the inner edge 27' of said plate abuts against the disk D. In each instance this tubular member is held against movement by a plate 34 having an inwardly extending hook 35 adapted to take into the eye 29 on the lug 28 and adapted to be locked at its upper end 36 by suitable key-controlled locking mechanism associated with the plate. As shown, the lug 30 has a reduced end portion projecting outwardly beyond the plate 34 and is apertured directly adjacent said plate when in locked position to receive the locking bar 37 of a padlock 38 so that said plate is locked to the plate 27, and when in this position engages spaced lugs 39 on the member 31 to that said member 31 is locked against removal and hence the ends of the bars 21 or 21' over which said member 31 fits are locked against removal. While I have shown a padlock associated with the lug 30 and plate 34, it will be understood that any other suitable form of key-controlled lock may be used with these parts to hold the tubular member 31 against movement and thus hold the bars 21 or 21' against movement.

With either of the constructions shown, release of the padlock 38 from the lugs 30 permits the plate 34 to be swung down out of engagement with the lugs 39 and out of hooked engagement with the eye 29 so that said plate 34 may be removed and then the tubular member 31 may be moved outwardly relative to the bars 21 or 21' so as to be freed from said bars, under which conditions these bars may be swung outwardly away from the rear of the vehicle so as to either permit removal of the spare tire 19 from the holder 20, or the spare tire and wheel 19' from the holder 20'. Swinging the bars 21 or 21' inwardly toward the rear of the vehicle, into abutting engagement with each other, as shown in Fig. 5, and setting the tubular member 31 over said ends and locking the plate 34 in position within said member and against the lugs 39 thereof, prevents movement of said member 31 and hence holds the free ends of the bar 21 or 21' against movement and prevents removal of the tire or wheel and tire.

Attention is also called to the fact that not only do the bars 21 or 21' act to lock the tire or spare wheel but they also protect the tire or spare wheel from rear end collisions and further act as braces for the side buffer sections, including the bars 15.

It will, of course, be understood that locking a single bar, such as one of the bars 21 or 21', in position will prevent removal of the tire, but in order to more securely lock the tire and produce a symmetrical design, I have used a pair of locking members.

By the term "spare tire" in the claims, I means a spare tire alone or one associated with a spare wheel.

I desire it to be understood that this invention is not to be limited to any particular form or arrangement of parts except in so far as such limitations are specified in the claims.

What I claim as my invention is:

1. The combination with a pair of bumper sections adapted to be secured in spaced relation to the rear end of an automobile, of substantially rigid means interposed between said bumper sections and secured thereto, movable means cooperating with said last mentioned means for forming a spare tire receiving space, said movable means being formed to project through said spare tire, and means for locking said movable means against displacement relative to said rigid means to prevent removal of said spare tire.

2. The combination with a pair of bumper sections adapted to be secured in spaced relation to the rear end of an automobile, of substantially rigid means interposed between said bumper sections and rigidly secured thereto, movable means cooperating with said last mentioned means and with said bumper sections for forming a spare tire receiving space, said movable means being formed to project into the spare tire, and means for locking said movable means directly to said rigid means intermediate its ends.

3. The combination with a pair of bumper sections adapted to be secured in spaced relation to the rear end of an automobile, of substantially rigid means interposed between said bumper sections and secured thereto, a plurality of movable means pivoted to said bumper sections and cooperating with said last mentioned means for forming a spare tire receiving space, and means for locking said movable means against displacement relative to said rigid means.

4. The combination with a pair of bumper sections adapted to be secured in spaced relation to the rear end of an automobile, of substantially rigid means interposed between said bumper sections and secured thereto, a plurality of movable means pivoted to said bumper sections and cooperating with said last mentioned means for forming a spare tire receiving space, and means including tubular member interengageable with said plurality of movable means for locking them against displacement.

5. The combination with a pair of bumper sections adapted to be secured in spaced relation to the rear end of an automobile, of substantially rigid means interposed between said bumper sections and secured thereto, a member pivoted to one of said bumper sections, a second member pivoted to the other of said bumper sections, said members being adapted to cooperate with said rigid means to form a spare tire receiving space, and means for locking the free ends of the pivoted members to the rigid means intermediate its ends.

6. Apparatus adapted to be secured to an automobile to serve as a bumper and to prevent unauthorized removal of a spare tire carried by the automobile, said apparatus comprising a rigidly mounted member adapted to extend transversely of the automobile at the rear thereof, a plurality of pivoted members cooperating with said rigidly mounted member to form a spare tire receiving space, and means for locking said pivoted members against displacement relative to said rigidly mounted member.

7. Apparatus adapted to be secured to an automobile to serve as a bumper and to prevent unauthorized removal of a spare tire carried by the automobile, said apparatus comprising a rigidly mounted member adapted to extend transversely of the automobile at the rear thereof, a plurality of pivoted members cooperating with said rigidly mounted member to form a spare tire receiving space, a tubular member interengageable with said pivoted members, and means for locking said tubular member to said pivoted members to prevent displacement thereof relative to said rigidly mounted member.

8. Apparatus adapted to be secured to an automobile to serve as a bumper and to prevent unauthorized removal of a spare tire carried by the automobile, said apparatus comprising a rigidly mounted member adapted to extend transversely of the automobile at the rear thereof, a plate secured to said rigidly mounted member intermediate its ends, a plurality of pivoted members cooperating with said rigidly mounted member to form a spare tire receiving space, a tubular member interengageable with said pivoted members and said plate, and means for locking said tubular member to said plate and said pivoted members to prevent displacement of said pivoted members relative to said rigidly mounted member.

9. The combination with a pair of bumper sections adapted to be secured in spaced relation to the rear end of an automobile, of a bar interposed between said bumper sections and rigidly secured thereto, a plurality of bars pivoted on said bumper sections and adapted to form a spare tire receiving space between them and the first mentioned bar, a tubular member interengageable with said plurality of bars and said first mentioned bar, and means for locking said tubular member to said plurality of bars and said first mentioned bar to prevent displacement of said pivoted bars relative to said first mentioned bar.

10. Apparatus adapted to be secured to an automobile to serve as a bumper and to prevent unauthorized removal of a spare tire carried by the automobile, said apparatus comprising a rigidly mounted member adapted to extend transversely of the automobile at the rear thereof, a plate secured to said rigidly mounted member intermediate its ends and provided with an apertured lug, a plurality of pivoted members cooperating with said rigidly mounted member to form a spare tire receiving space, a tubular member interengageable with said pivoted members and said plate, a second plate having means for engaging said apertured lug, and means for locking said second plate and said tubular member to said first mentioned plate and to said pivoted members to prevent displacement of said pivoted members relative to said rigidly mounted member.

11. The combination with a pair of bumper sections adapted to be secured in spaced relation to the rear end of an automobile, of a bracket adapted to be secured to the automobile, said bracket being adapted to hold a spare tire, movable means carried by one of said sections and adapted to cooperate with the bracket to form a spare tire receiving space, and means for locking said movable means to the bracket.

In testimony whereof, I affix my signature.

CHARLES G. MORRELL.